Jan. 10, 1939.　　　M. D. COULTER　　　2,143,188
REFRIGERATION
Filed Dec. 6, 1935　　　2 Sheets-Sheet 1
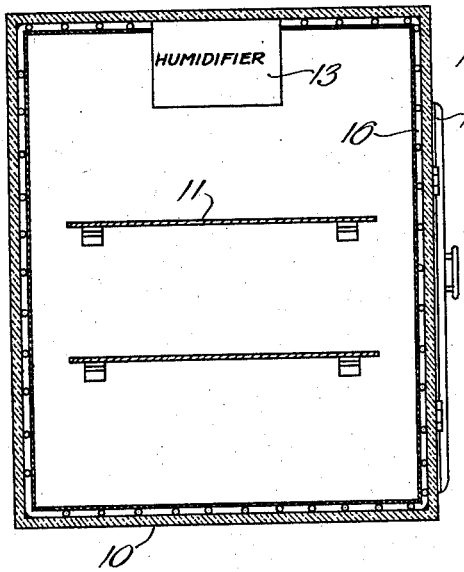
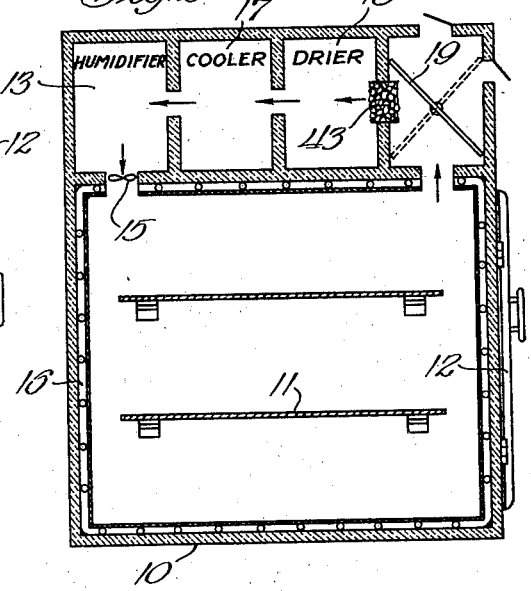
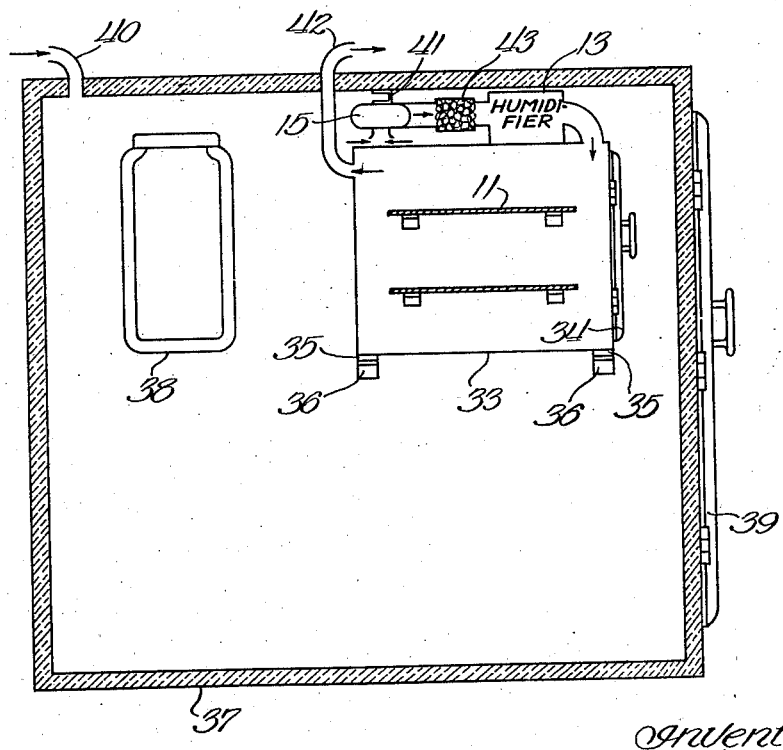

Jan. 10, 1939.  M. D. COULTER  2,143,188
REFRIGERATION
Filed Dec. 6, 1935  2 Sheets-Sheet 2

Inventor:
Marion D. Coulter
By Williams, Bradbury, McCabe
& Hinkle.  Attys.

Patented Jan. 10, 1939

2,143,188

UNITED STATES PATENT OFFICE

2,143,188

REFRIGERATION

Marion D. Coulter, Pittsburgh, Pa., assignor to Toledo Scale Manufacturing Company, Toledo, Ohio, a corporation of New Jersey Application December 6, 1935, Serial No. 53,131

14 Claims. (Cl. 62—89)

Refrigeration has not heretofore been used successfully for preservation of produce, because of certain difficulties that have been encountered. For example, the atmosphere of a mechanical refrigerator is so dehydrating that it makes susceptible kinds of produce, such as leafy vegetables, unsalable in the course of two or three days. It has been found, moreover, that produce cannot be preserved properly in an air-tight receptacle in a refrigerator. Circulation of air into contact with the produce is necessary to prevent it from deteriorating, because it is alive, and because, unlike meat, it must be kept alive and healthy if it is to remain in salable condition.

Accordingly, the atmosphere of refrigerators containing produce has been allowed to circulate into contact with it, and sprinkling or dampening of the produce has been resorted to in an effort to retard its dehydration. Yet wetting the surface of a plant of any kind clogs its breathing pores and kills the vegetational tissue beneath the pores by cutting off the air supply. When this tissue is no longer alive, it acquires an altered appearance. Thus leafy tissue, such as spinach, becomes slimy; buds, such as head lettuce, swell, burst, and acquire a musty odor; and other tissue becomes rusty or otherwise discolored. In addition, the tissue becomes highly susceptible to the attack of bacteria and mold, so that its deterioration accelerates upon its removal from the refrigerator. And it must be removed therefrom during the day if it is still in the hands of the retailer, because the sale of produce is so slow as to be unprofitable unless it is kept on open display racks.

As a matter of fact, no satisfactory system whatsoever for preserving produce has been available. By reason of the lack of such a system, the retailer must throw out unsold produce after as little as two days on his shelves. Thus there is a spoilage loss of 25 to 75% in each lot of produce merchandised, and the total annual spoilage loss in the United States amounts to about fifty million dollars. The want of a preservation system is also responsible for the shortness of the season for which each product is available in quantity, and for the prevalence of the practice of substituting undesirable artifically ripened products.

The retailer must now supply himself with a surplus of produce above his needs, because the consequence of understocking is immediate and permanent loss of trade. If he could keep each lot of produce in marketable condition for only a few days longer than at present, he would be able to sell each day's surplus on succeeding days, so that his losses would be substantially reduced. The local retailer is also prevented from introducing an unfamiliar type of vegetable or fruit to his customers by fear of prohibitive spoilage losses during the period in which sales are slow, before the community has become acquainted with the new product.

Refrigerating systems operating in accordance with the invention are particularly applicable to preservation of vegetational tissues, such as roots, bulbs, tubers, stems, leaves, flowers and fruits, that deteriorate by transpiration of their fluid constituents. Whatever the form of cooling system that is used, the temperature of the air surrounding the produce is preferably maintained between 32 and 60 degrees F., and its relative humidity is preferably kept in a certain range that is very effective for keeping the vegetational tissue in a living and healthy condition. It has been found that there is a narrow critical range of relative humidity below which green produce suffers rapid dehydration and above which there occurs a phenomenon which may be termed "dew formation". This phenomenon has been found to give much less trouble when the temperature is held below 60 degrees F. In addition to reducing dew formation, the maintenance of a reduced temperature by a cooling or refrigerating apparatus has been found to eliminate the mold growth that flourishes at higher temperatures and to retard the respiration of the produce and the internal chemical changes that are connected with it.

Harvested produce is subject to an accumulation of water on its surface that is due neither to deposition of mist particles nor to condensation produced by temperature differential, particularly when it consists of succulent tops with roots attached, as in the case of radishes and onions. This "dew" leads to the disastrous consequences that have been stated to flow from water films on the surface of produce.

It is believed that the dew is caused by exudation of moisture upon the surface of the plant that has risen from the ample reservoir of liquid in the roots. Dew formation can be prevented by the maintenance of a relative humidity below a certain value that depends upon other factors, such as rate of air flow. If the relative humidity is kept low enough to prevent dew formation on the type of produce named, no similar difficulty is experienced with other kinds of produce stored in the same compartment.

The preferred method of delicately controlling relative humidity within this narrow range close to saturation is carried out by adjusting the relative humidity of a stream of air and passing the air over the produce, so that the proper relative humidity is attained through evaporation from the produce while the air is in contact therewith. Thus, a close adjustment of the relative humidity in a closed compartment may be carried out by regulation of the relative humidity of the incoming air over a wide range.

The rate of circulation of the air has been found to be important as well as the relative humidity, so that both of these factors may be controlled in order to prevent dew formation. In fact, it is possible for the relative humidity to be kept constant while the rate of circulation is maintained just high enough to prevent both the dew formation and the rapid dehydration.

The relative humidity of the atmosphere in which produce is stored should be low enough to prevent dew formation on vegetables such as radishes and high enough to prevent rapid dehydration of the other vegetables. Thus, when a cabinet of one cubic foot volume is employed, with a temperature of 50 to 55 degrees F., air entering at a rate sufficient for a complete change of the air every five minutes should have a relative humidity of about 85% in case red radishes are present. Although air of 85% relative humidity entering at the stated rate does not cause serious dehydration of the produce, the air should be introduced at about 90% relative humidity whenever the cabinet contains green onions but not radishes. Other produce in the cabinet will keep even better if the air is introduced at 95% relative humidity—a value that is permissible when both green onions and red radishes are absent.

The invention makes possible the refrigeration of a storage compartment in which a high relative humidity is maintained, in such a manner that products in the compartment are subject neither to condensation of water nor to dehydration.

It contemplates a departure from the prior practices that have been described. In the use of the novel system of refrigeration hereinafter disclosed, it is not necessary either to cut off air circulation from produce being refrigerated, or to moisten the produce. The principal object of the invention is to provide a system of refrigeration that can be successfully applied to products of the soil. More specific objects and advantages are apparent from the description, in which reference is had to the accompanying drawings illustrating preferred apparatus for carrying out the invention.

Fig. 1 of the drawings is a diagrammatic section of a compartment embodying the invention;

Fig. 2 is a diagrammatic section of a similar compartment, having added thereto a system for cooling air and passing it through the compartment;

Fig. 3 is a diagrammatic section of a modified compartment;

Figure 4:
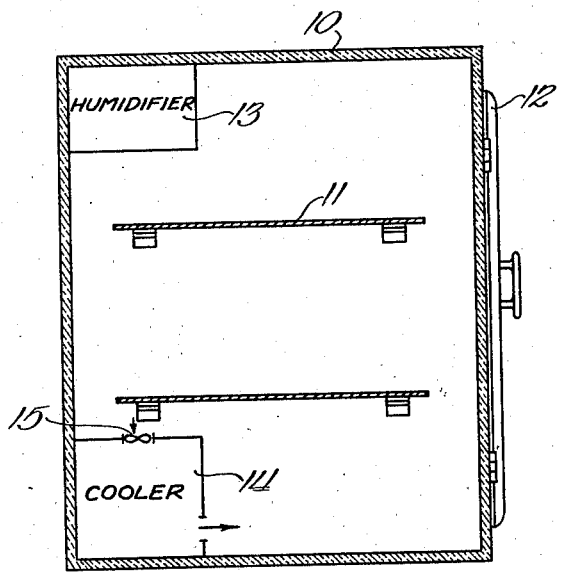
Fig. 4 is a diagrammatic section of a third type of compartment.

These specific drawings and the specific description that follows merely disclose illustrative applications of the invention, and are not to impose limitations upon the claims.

The relative humidity in a mechanical refrigerator may fall as low as 25 to 30%. In a series of comparative experiments produce was found to deteriorate almost as rapidly in a mechanical refrigerator as when kept in air having a relative humidity of 10 to 20%, like that sometimes encountered in arid western States.

In one of the experiments an assortment of vegetables was kept in an ordinary domestic refrigerator at 39 degrees to 43 degrees F., the refrigerator being opened once each day for examination of the produce. The following observations were made:

*Spinach.*—Wilted badly in 24 hours and was unusable as food in three days.

*Celery.*—Wilted slightly in 24 hours and was limp in 48 hours. After nine days it could be partially restored by soaking at length in cold water.

*Carrots.*—The tops wilted rapidly. The tuber became limp and was unusable after the fourth day. It could not be restored by soaking in water after the ninth day.

*Green peas.*—The pod took on a dry and wilted appearance very gradually. When examined at the end of the ninth day the peas on the interiors of the pods were dry and tough and had developed a brown color in numerous cases, but showed limited shrinkage.

*Beets.*—The tops shrank rapidly at the end of nine days and the beet was badly withered and did not bleed when cut, but recovered very well when soaked in water.

*Head lettuce.*—Exterior appearances suggested that a considerable shrinkage of head lettuce had occurred. Investigation showed that the major portion of the loss had occurred from the outer layers of the head and that the interior was in fair condition with no appreciable mustiness apparent.

In another experiment an assortment of vegetables was kept in a domestic refrigerator at 40 to 44 degrees F. At the end of the first and of the second day, the vegetables were examined. Then they were left in the refrigerator for four more days with the door remaining shut. Deterioration of the produce took place in the same manner as in the first experiment described, and the percentage weight loss found upon each examination of the specimens is tabulated below for comparison with the percentage losses of vegetables refrigerated in accordance with the invention.

| Period in days | Loss in percentage of initial weight | | | | | |
| --- | --- | --- | --- | --- | --- | --- |
| | Spinach | Green peas | Green beans | Green onions | Celery | Carrots |
| 1 | 31.0 | 7.9 | 8.0 | 8.6 | 13.9 | 7.8 |
| 2 | 41.0 | 14.5 | 12.8 | 13.3 | 21.8 | 12.0 |
| 6 | 68.0 | 39.5 | 36.9 | 32.4 | 56.9 | 39.3 |

| Period in days | Loss in percentage of initial weight | | | |
| --- | --- | --- | --- | --- |
| | Head lettuce | Beets | Red radishes | White radishes |
| 1 | 6.5 | 20.3 | 36.4 | 26.9 |
| 2 | 10.7 | 22.8 | 45.1 | 36.3 |
| 6 | 20.1 | 42.1 | 71.6 | 65.9 |

The effect of sprinkling vegetables lightly and placing them in a container in a refrigerator was also determined. Although slight circulation of the air of the refrigerator into contact with the produce was permitted in order to keep it alive, serious deterioration took place. Beet tops and spinach became slimy and water-logged in three days although sprinkled very slightly. Numerous small, scarcely noticeable discolored spots on green pea specimens were greatly increased in size by contact with water. Celery suffered an undue loss of crispness, because of moisture loss. In the case of head lettuce, rustiness of the outer leaves developed, so that they had to be removed.

It was discovered that when the evaporating coil in a refrigerator is operated at a temperature slightly above freezing, dehydration of the produce takes place at the same rate as when the evaporating coil is operated at the normal freezing temperature. The water vapor in the air condenses on the coil instead of forming frost, there being a differential of about 20 degrees F. between the temperature of the coil and the temperature of the air in the refrigerator, and of about 10 degrees F. between the temperature of the metal refrigerator walls and the temperature of the air. That the difference between the vapor pressure of ice on the coils and the vapor pressure of water condensed on the coils does not affect the rate of dehydration of produce in the refrigerator is demonstrated by the following percentage losses of weight incurred during periods of one to six days, by produce stored in a refrigerator with a cooling coil at a temperature of 33 to 34 degrees F.:

| Period in days | Loss in percentage of initial weight | | | | |
| --- | --- | --- | --- | --- | --- |
| | Spinach | Green peas | Green beans | Celery | Carrots |
| 1 | 26 | 4 | 6 | 6.0 | 8.3 |
| 2 | 37 | 11 | 11 | 10.2 | 13.5 |
| 3 | 45 | 16 | 16 | 15.0 | 19.5 |
| 4 | 51 | 21 | 21 | 19.2 | 25.1 |
| 5 | 56 | 25 | 26 | 22.9 | 30.4 |
| 6 | 61 | 29 | 30 | 26.3 | 35.7 |

| Period in days | Loss in percentage of initial weight | | | |
| --- | --- | --- | --- | --- |
| | Head lettuce | Parsnips | Tomatoes | Broccoli |
| 1 | 2.8 | 8.0 | 0.7 | 6.0 |
| 2 | 5.2 | 14.7 | 0.7 | 10.9 |
| 3 | 6.5 | 20.0 | 1.3 | 15.8 |
| 4 | 8.5 | 25.3 | 1.3 | 20.4 |
| 5 | 10.4 | 30.0 | 1.3 | 24.2 |
| 6 | 12.4 | 34.0 | 1.3 | 28.0 |

In many experiments carried out with the cooling coil at this temperature, weight losses of produce stored in a refrigerator were found to check closely those tabulated above. Loss of moisture at such a rate makes spinach unsalable in two days, green onions, celery, carrots and red radishes unsalable in three days, and green peas, parsnips, asparagus, cauliflower and green beans unsalable in four days.

In the preferred system for refrigerating products of the soil in a closed compartment, the compartment 10, which may be provided with shelves 11 and a door 12 that opens for access to the interior, is equipped with a humidifier 13. Within the compartment is preferably provided means for cooling the air at a sufficient rate to maintain the temperature of the air throughout the compartment substantially close to its temperature when adjacent the cooling means, in order to prevent dehydration of produce in the compartment.

Thus there may be a cooler 14 in the compartment with a fan 15 for circulating the air as shown in Fig. 4, or banks of cooling coils 16 lining the walls of the compartment and covered with a sheet of heat-conducting material that is kept at a substantially uniform temperature by the coils, as shown in Figs. 1 and 2. Both a large area of the cooling surface and a rapid circulation of the air may be relied upon, if desired, to keep the temperature of the air from rising in the compartment high enough above the temperature of the cooling surface so that the air can absorb moisture from the produce, to be condensed when the air returns to the cooling surface.

The humidification of the air is preferably carried out at a temperature as low as the minimum temperature that it attains in the compartment so that no condensation may occur in the compartment. Thus, a cooler 17 may be provided to regulate the temperature of the air stream at the point of humidification. A drier 18 relieves the cooler of much of its load, because it adds a quantity of heat to the air entering the cooler that can be removed after the air leaves the cooler by simply humidifying the air. Thus the air that has been warmed in the dryer only needs to have its temperature reduced by the cooler about the same amount that would be required if no drier were employed. After the air has passed through the cooler, the sensible heat that was added in the drier is automatically removed from the air in the humidifier by conversion into latent heat of water vapor. A damper 19 may be used to make possible the substitution of air taken from the cabinet for part of the supply of fresh air whenever the cabinet air has a lower heat content than the fresh air.

Figure 5:
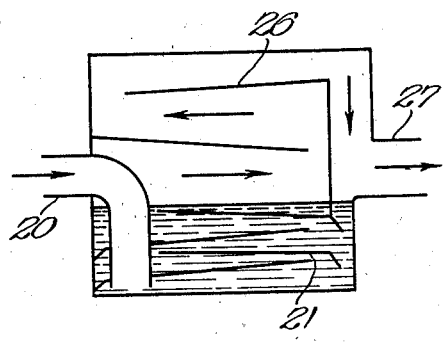
Fig. 5 is a diagrammatic section of a humidifier that may be used in the practice of the invention.
Figure 6:
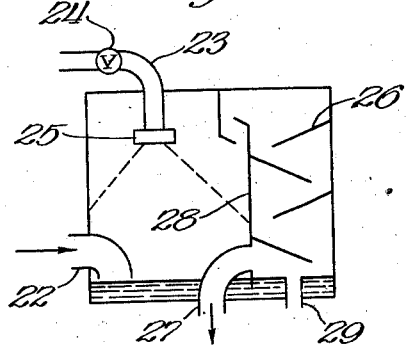
Fig. 6 is a diagrammatic section of a second type of humidifier.

The humidifier used in the system may include a reservoir of water (Fig. 5) to the bottom of which the air is led by means of an inlet duct 20, when it bubbles upward through the water, in a circuitous path past the baffles 21. Alternatively, the air may be led through an inlet 22, directed downwardly to prevent egress of water, into a humidifier (Figs. 6 and 7) that is supplied with running water through a water inlet 23 controlled by a valve 24. In the humidifier of Fig. 6 the stream of air is humidified by passage through a spray issuing from a spray head 25. For a spray to treat 25 cubic feet of air per hour a flow of water of about 0.6 gallons per hour is sufficient.

Air that is passed through a spray emerges heavily laden with liquid particles. If the air is then brought into contact with produce, a film of water is deposited upon the surface thereof so that all the serious consequences follow that have been described at the beginning of the specification.

Thus, it is preferable for the air to be humidified without the introduction of a substantial amount of liquid particles. Means for substantially excluding particles of liquid water from the air may be provided, such as the mist-separating baffles 26 over which the air passes on its way to the outlet 27. In the humidifier of Fig. 6, the system of baffles is separated from the spray chamber by a partition 28 extending nearly to the top of the humidifier and having its lower edge dipping below the surface of the water level that is maintained in the bottom by the overflow spout 29.

Figure 7:
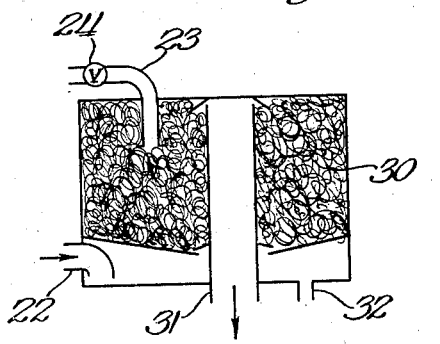
Fig. 7 is a diagrammatic section of a third type of humidifier.

In another type of humidifier that may be used to supply air free from mist, the air merely passes over an extended surface of water, such as that provided by the glass wool 30 in the chamber of Fig. 7. Thus, the air is humidified without picking up liquid particles. It may be passed upward through the saturated glass wool and withdrawn at the top of the humidifier through a central outlet duct 31, and the surplus water may be drained through an outlet 32.

The air is preferably not only kept at a minimum temperature, at the point of humidification, but also maintained at temperatures not substantially higher than the minimum, in the compartment, so that dehydration as well as condensation may be prevented. An excessive rise in the temperature of the air in the compartment may be effectively prevented by surrounding the compartment with a cooling medium, such as air, and refrigerating the medium to a substantially uniform temperature. Thus, there may be provided a refrigerated chamber containing cold air and a storage compartment within the chamber having thermally conductive walls surrounded by the atmosphere of the chamber, the storage compartment being preferably thermally insulated from surfaces in the refrigerating chamber that are at a temperature substantially below that of the atmosphere. When the inner compartment is so insulated, its walls contact only the atmosphere of the chamber and surfaces that are at temperatures approximating that of the atmosphere so that the compartment is protected against the entrance of heat and is maintained at the temperature of the atmosphere in the outer chamber.

The regulation of the temperature of the air in the humidifier and in the compartment is most conveniently carried out by uniformly refrigerating the air in the compartment and in the humidifier.

The humidifier and the compartment may be arranged in a refrigerator to be cooled to substantially equal temperatures, and the humidifier may be provided with a water reservoir, so that the water is also supplied at the same temperature. The preferred arrangement of the humidifier and storage compartment in a refrigerator is illustrated in Fig. 3. In the system there shown, the humidified compartment 33, provided with a door 34, rests upon pads 35 of thermally insulating material supported by brackets 36 on the inside of the insulated walls of the refrigerator cabinet 37. When the refrigerator walls are not lined with sheet metal or other thermally conducting material in contact with the evaporating coil 38 or other cooling unit, the insulating pads 35 need not be used. Air may be drawn into the refrigerator cabinet through an inlet 40 by means of a fan 15 supported by a bracket 41, passed through a humidifier 13 into the compartment 33 and then exhausted to the exterior of the refrigerator cabinet through an outlet 42. In any air-circulating system operating in accordance with the invention, a filter 43 may be inserted at a convenient point, preferably containing deodorizing materials, such as activated charcoal.

A refrigerating system operating in accordance with the invention can be used very conveniently to preserve produce by keeping it at temperatures between 32 and 60 degrees F., and maintaining the proper atmospheric conditions that have been described. It is possible not only to maintain proper temperatures, but also to circulate the air at the correct rate and to protect the produce against condensation of moisture and against dehydration, so that it remains in perfect condition.

In order to show how well produce is protected against dehydration when proper atmospheric conditions are maintained, there are tabulated below the total weight losses that were measured at the end of each day of an experiment in which an assortment of vegetables was kept in excellent condition at 50 degrees F. for six days in a cabinet of one cubic foot volume, by replacement of the cabinet's atmosphere at the rate of six changes per hour with air at a relative humidity of 84 percent.

| Period in days | Loss in percentage of initial weight | | | | |
|---|---|---|---|---|---|
| | Spinach | Green peas | Green beans | Green onions | Celery |
| 1 | 3.4 | 0.9 | 0.8 | 0.8 | 2.8 |
| 2 | 4.2 | 1.8 | 0.8 | 0.8 | 3.5 |
| 3 | 5.1 | 1.8 | 1.6 | 1.7 | 4.2 |
| 4 | 5.9 | 2.7 | 1.6 | 1.7 | 5.2 |
| 5 | 6.7 | 2.7 | 2.4 | 1.7 | 5.9 |
| 6 | 7.6 | 2.7 | 2.4 | 1.7 | 5.9 |

| Period in days | Loss in percentage of initial weight | | | | |
|---|---|---|---|---|---|
| | Carrots | Head lettuce | Red radishes | White radishes | Asparagus |
| 1 | 1.5 | 1.0 | 1.3 | 1.1 | 0.6 |
| 2 | 2.1 | 1.0 | 2.3 | 1.9 | 1.3 |
| 3 | 2.5 | 1.5 | 2.4 | 2.4 | 1.9 |
| 4 | 2.7 | 2.0 | 4.4 | 3.7 | 1.9 |
| 5 | 2.9 | 2.5 | 4.4 | 3.7 | 2.2 |
| 6 | 3.1 | 3.0 | 4.7 | 3.7 | 2.2 |

In another experiment, the atmosphere of a cabinet, which was of the same size and was kept at 50 to 55 degrees F., was replaced with humidified air at the rate of one change every five hours, and the following results were obtained.

| Period in days | Loss in percentage of initial weight | | | | |
|---|---|---|---|---|---|
| | Spinach | Green peas | Green beans | Celery | Carrots |
| 1 | 2 | −2 | −2 | 1.1 | 1.1 |
| 2 | 3 | −1 | −2 | 1.1 | 1.3 |
| 3 | 5 | −1 | −2 | 1.5 | 1.8 |
| 4 | 6 | −1 | −2 | 1.5 | 2.1 |
| 5 | 7 | 0 | −2 | 1.9 | 2.4 |
| 6 | 8 | 0 | −2 | 1.9 | 2.7 |

| Period in days | Loss in percentage of initial weight | | | |
|---|---|---|---|---|
| | Head lettuce | Parsnips | Tomatoes | Broccoli |
| 1 | 0.2 | 0.0 | 0.0 | 0.7 |
| 2 | 0.5 | 0.0 | 0.0 | 1.0 |
| 3 | 1.0 | 0.0 | 0.0 | 1.0 |
| 4 | 1.2 | −0.5 | 0.0 | 1.0 |
| 5 | 1.2 | −0.5 | 0.0 | 1.3 |
| 6 | 1.4 | −0.5 | 0.0 | 1.3 |

An entering flow of air at this rate is about the least that can be used. Even when the cabinet was opened only once a day, the produce lost moisture at an appreciable rate, as shown by the above table. A humidifier of the same size was used in a subsequent experiment carried on at the same temperature, to humidify a flow of air 36 times as great passing to the cabinet. Highly satisfactory preservation of the produce for six days resulted. Because of the more rapid air flow, and also probably because of failure of the humidifier to bring the air as close to saturation as when the rate of flow was less, the losses of weight, tabulated below, were similar to those produced by the smaller rate of air flow.

| Period in days | Loss in percentage of initial weight | | | |
|---|---|---|---|---|
| | Spinach | Green peas | Green beans | Green onions |
| 1 | 0 | −2.0 | −1.0 | 0.0 |
| 2 | 0 | −2.0 | −1.0 | 0.0 |
| 3 | 0 | −2.0 | −1.0 | 0.0 |
| 4 | 0 | −2.0 | −1.0 | 0.0 |
| 5 | −0.5 | −2.0 | −1.0 | 2.5 |
| 6 | −1.0 | −2.0 | −1.0 | 2.5 |

| Period in days | Loss in percentage of initial weight | | | | |
|---|---|---|---|---|---|
| | Celery | Carrots | Beets | Head lettuce | Parsnips |
| 1 | 1.5 | 0.5 | 0.5 | 0.5 | 1.0 |
| 2 | 3.0 | 1.5 | 1.5 | 1.5 | 1.0 |
| 3 | 3.5 | 1.5 | 1.5 | 1.5 | 1.0 |
| 4 | 3.5 | 1.5 | 1.5 | 1.5 | 1.0 |
| 5 | 3.5 | 2.0 | 1.5 | 2.0 | 1.0 |
| 6 | 4.0 | 2.0 | 1.5 | 2.5 | 1.0 |

Simultaneously with the last experiment described, a determination was carried out of the effect of storing produce in a walk-in mechanically refrigerated cooler containing several hundred pounds of ice. After six days of storage the produce in the cooler had deteriorated substantially in quality. In addition to some substantial moisture losses, deposition of moisture through dew formation or condensation was observed. This moisture caused sliming of succulent tops, and it is probable that the relative humidity, rate of air circulation, and other conditions prevailing in the cooler were unsuitable. The daily weight losses of the produce in the cooler are tabulated below:

| Period in days | Loss in percentage of initial weight | | | |
|---|---|---|---|---|
| | Spinach | Green peas | Green beans | Green onions |
| 1 | 8.5 | 0.0 | 0.5 | 2.5 |
| 2 | 11.5 | 1.5 | 1.0 | 4.5 |
| 3 | 13.5 | 2.0 | 1.5 | 4.5 |
| 4 | 15.0 | 2.0 | 2.0 | 7.5 |
| 5 | 17.0 | 3.0 | 3.0 | 7.5 |
| 6 | 18.5 | 4.0 | 5.0 | 9.5 |

| Period in days | Loss in percentage of initial weight | | | | |
|---|---|---|---|---|---|
| | Celery | Carrots | Beets | Head lettuce | Parsnips |
| 1 | 6.0 | 3.5 | 2.5 | 2.0 | 1.0 |
| 2 | 7.5 | 4.5 | 3.5 | 2.5 | 2.0 |
| 3 | 9.5 | 5.5 | 4.5 | 3.0 | 2.5 |
| 4 | 11.5 | 7.5 | 6.5 | 3.0 | 2.5 |
| 5 | 13.0 | 9.0 | 7.5 | 3.5 | 3.0 |
| 6 | 14.5 | 9.5 | 8.5 | 4.0 | 3.5 |

The embodiments of the invention that have been disclosed may be modified, and various other systems embodying the substance of the invention may be devised, to meet various requirements.

Having thus described my invention, I claim:

1. In an apparatus of the class described, in combination, a storage compartment for products of the soil, means for circulating air through the compartment, means for cooling the compartment, and separate means for humidifying the air to be circulated at a point in its path where it is at a temperature as low as the minimum temperature reached by the air in the compartment while excluding particles of liquid water from the air.

2. An apparatus of the class described comprising, in combination, a refrigerated chamber, a compartment for products of the soil within the chamber having thermally conductive walls surrounded by the atmosphere of the chamber, and means for thermally insulating said compartment from surfaces in the refrigerated chamber that are at temperature substantially below the average temperature of said atmosphere.

3. A self-contained apparatus for a refrigerator comprising a compartment for storage of products of the soil, a humidifier having a water reservoir, and means for passing air through the humidifier into the compartment, the humidifier and compartment being surrounded by the air of the refrigerator and so arranged in the refrigerator as to be cooled to substantially equal temperatures whereby dehydration and condensation in the compartment are obviated.

4. In an apparatus of the class described, in combination, a storage compartment for a product of the soil, means for circulating air through the compartment, means for humidifying the air to be circulated in the compartment, and means for separately cooling the compartment and circulating air, adapted to maintain the temperature of the air as low at the point of humidification as at any other point.

5. In an apparatus of the class described, in combination, a storage compartment for a product of the soil, means for passing a stream of air into the compartment, means for humidifying the stream of air before it enters the compartment, and means for cooling the compartment and stream of air adapted to maintain the temperature of the air in the stream substantially at a minimum at the point of humidification, and to prevent the temperature of the air from rising in the compartment substantially above the minimum.

6. In an apparatus of the class described, in combination, a storage compartment for a product of the soil, means for maintaining a high relative humidity in the compartment, means for surrounding the compartment on all sides with a cooling medium, and means for refrigerating the medium to a substantially uniform temperature.

7. In an apparatus of the class described, in combination, a refrigerated chamber, a closed compartment for products of the soil within the chamber having thermally conductive walls, which are surrounded on all sides by the atmosphere of the chamber and contact only surfaces in the chamber at temperatures substantially as high as the average temperature of said atmosphere, and means for maintaining a high relative humidity in the compartment without exposing the products to substantial contact with liquid water.

8. In an apparatus of the class described, in combination, a storage compartment for products of the soil, means for passing a stream of fresh air through the compartment, means for humidifying the entering air, while substantially excluding liquid particles from the air, and refrigerating means for maintaining the air in the compartment and the air leaving the humidifying means at a substantially uniform temperature.

9. In an apparatus of the class described, in combination, a refrigerated chamber, a closed storage compartment for a product of the soil within the chamber having thermally conductive walls in contact with the atmosphere of the chamber and with surfaces at temperatures substantially as high as the temperature of said atmosphere, and a humidifier for delivering air to the compartment at a temperature approximating that of said atmosphere.

10. A method of refrigerating products of the soil that comprises humidifying a stream of air, substantially excluding liquid particles from the air, passing it over the products, and separately cooling the air adjacent the products and the air at the point of humidification to a substantially uniform temperature, whereby the products are protected from dehydration and from condensation of water.

11. A method of refrigerating products of the soil that comprises passing air over the products, cooling the products, separately humidifying the air to be passed over the products at a temperature as low as the lowest reached by the air while in contact with the products, and substantially excluding liquid particles from the air.

12. A method of refrigerating products of the soil that comprises humidifying air, passing it over the products, separately cooling the products, and maintaining the temperature of the air at the point of humidification as low as the lowest temperature reached by the air in contact with the products.

13. A method of refrigerating products of the soil that comprises humidifying a stream of fresh air, passing the humidified air over the products, cooling the products and the stream of air, maintaining the temperature of the air substantially at a minimum at the point of humidification, and maintaining the temperature of the air adjacent the products substantially close to its temperature at the point of humidification.

14. A method of refrigerating a product of the soil that comprises passing air over the product, cooling the air surrounding the product at a sufficient rate to prevent any substantial rise in temperature from occurring while the air is adjacent the product, and separately humidifying the air to be passed over the product while maintaining it at a temperature substantially the same as the minimum temperature reached by the air that is passed over the product.

M. D. COULTER.